Aug. 8, 1939.  C. L. MEINHOLDT  2,168,738
MOWING MACHINE
Filed June 17, 1936   3 Sheets-Sheet 1
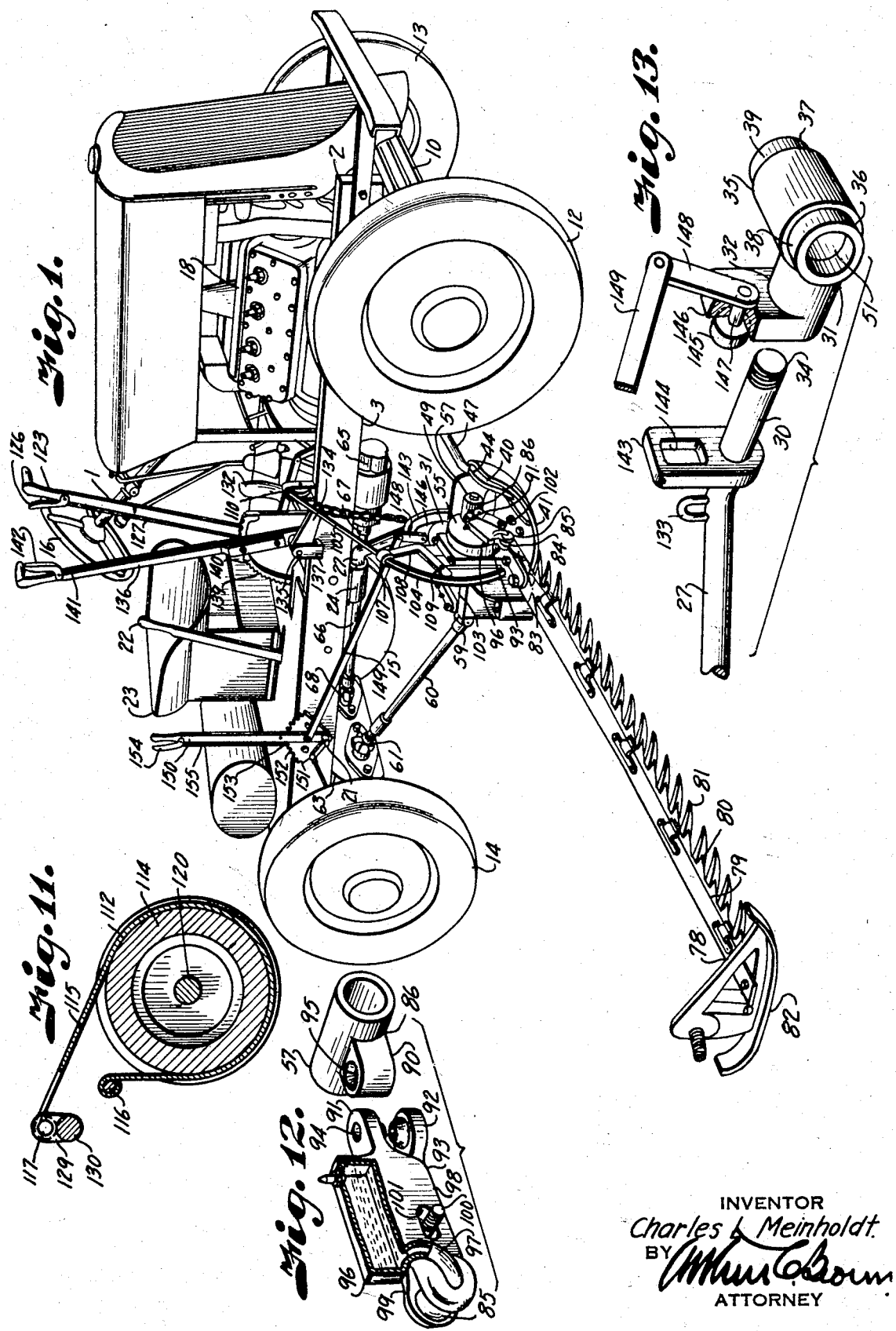
INVENTOR
Charles L. Meinholdt.
BY
ATTORNEY Aug. 8, 1939  C. L. MEINHOLDT  2,168,738
MOWING MACHINE
Filed June 17, 1936  3 Sheets-Sheet 2
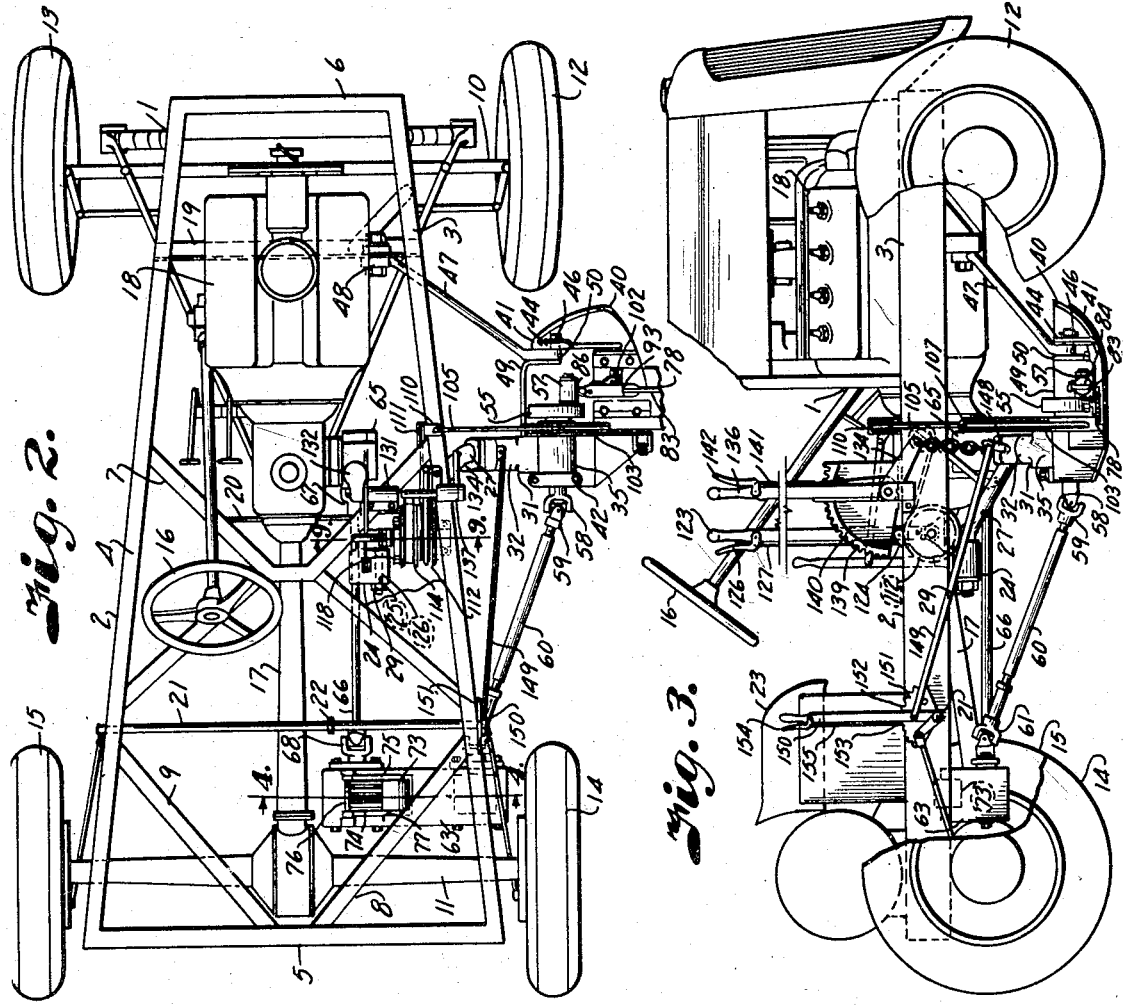
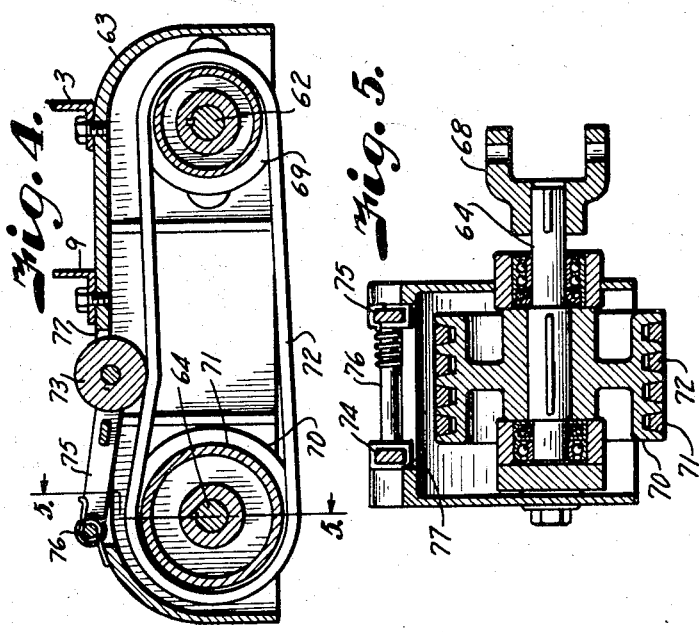
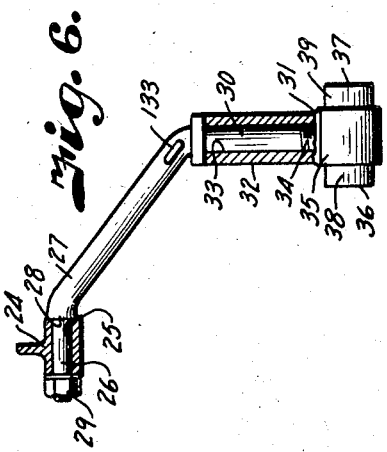
INVENTOR
Charles L. Meinholdt
BY
ATTORNEY Aug. 8, 1939.  C. L. MEINHOLDT  2,168,738
MOWING MACHINE
Filed June 17, 1936  3 Sheets-Sheet 3
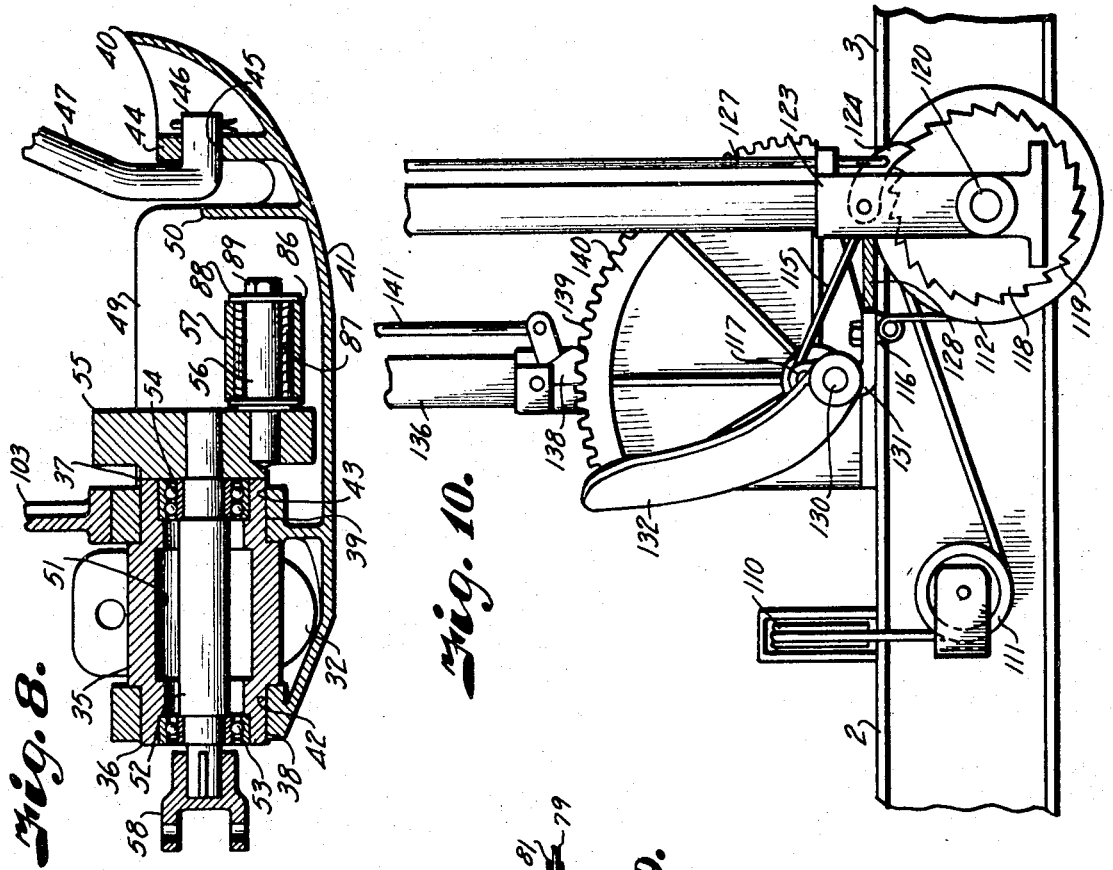
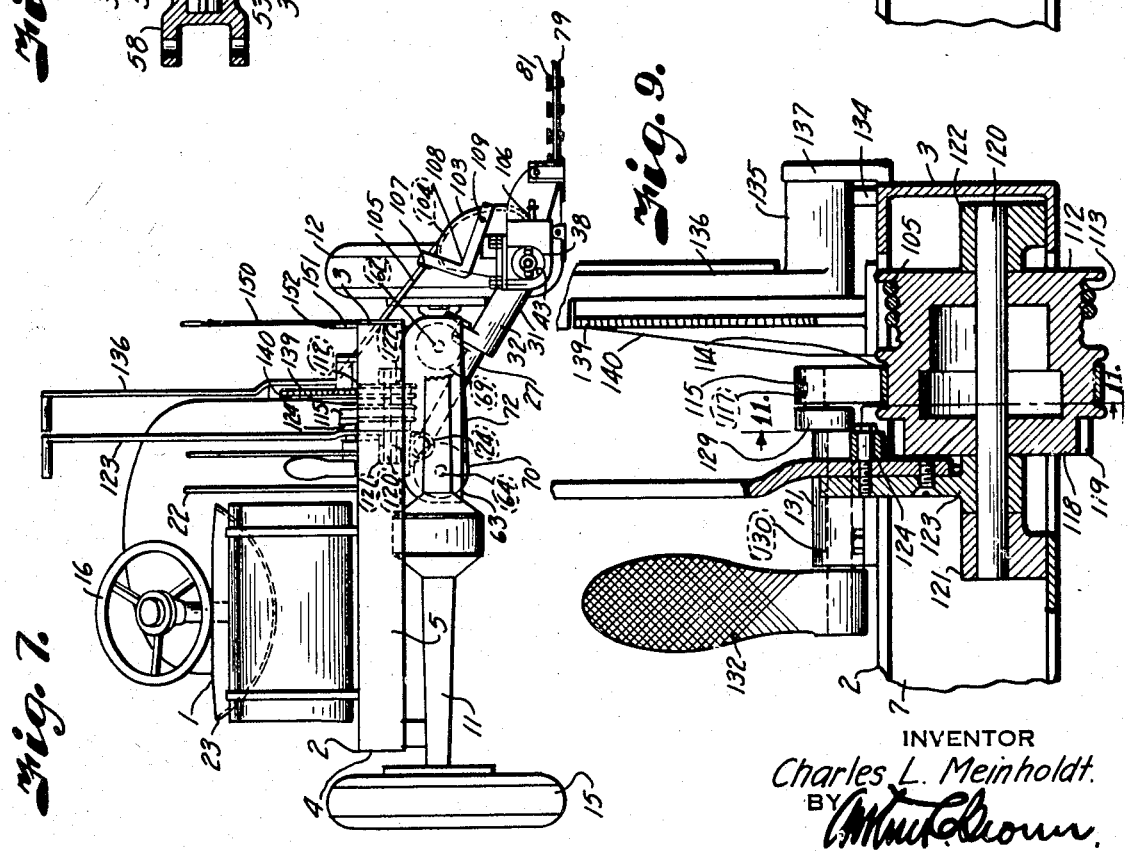
INVENTOR
Charles L. Meinholdt.
BY
ATTORNEY Patented Aug. 8, 1939

2,168,738

UNITED STATES PATENT OFFICE 2,168,738

MOWING MACHINE

Charles L. Meinholdt, Topeka, Kans., assignor of one-fourth to Fred P. Martin and one-fourth to Charles H. Martin, both of Topeka, Kans.

Application June 17, 1936, Serial No. 85,724

7 Claims. (Cl. 56—25)

This invention relates to mowing machines, particularly to those of the self-propelled type, and has for its principal object to provide a machine of this character adapted for mowing vegetation along the sides of a highway and which is so constructed that it is readily adjusted to closely follow irregular surfaces, such as shoulders, back slopes, drainage ditches, cuts and fills that are encountered along an ordinary highway.

Other important objects of the invention are to provide a quick-action operating mechanism for varying angularity of the sickle bar relatively to the machine; to provide for raising and lowering cutting height of the sickle bar while maintaining and/or changing the same cutting angle thereof; to provide a mower construction wherein the sickle bar may be lowered to an angle of 90° below the plane of the mower frame or raised to an angular position of 120° above said plane, thereby providing an operating range in excess of 180°; to provide greater elevational movement of the inner shoe of the sickle independently of the outer shoe; to provide means for retaining the sickle in any position to which it may be adjusted; and to maintain relative position of the cutter bar and guard teeth of the sickle throughout the range of angular adjustment.

It is also an important object to provide for automatic lubrication and adjustment of the pitman connection.

Further objects of the invention are to provide a short-coupled machine that may be operated in and out of ditches and on the shoulders according to the slope thereof; to provide a seat arrangement whereby the operator retains his vertical posture regardless of the angular position of the machine; and to provide means for driving the sickle from the motor which propels the mower but independently of the mower drive whereby the sickle may be operated regardless of movement of the mower.

In accomplishing these and other objects of the invention, I have provided improved details of structure, the preferred form of which is illustrated in the accompanying drawings, wherein:

Fig. 1 is a perspective view of a mowing machine embodying the features of the present invention.

Fig. 2 is a plan view of the machine.

Fig. 3 is a side elevational view of the machine.

Fig. 4 is a detail section through the driving connection between the power take-off shaft and the shaft actuating the sickle, the section being taken on the line 4—4 of Fig. 2.

Fig. 5 is a section on the line 5—5 of Fig. 4.

Fig. 6 is a detail view of the push bar which cooperates with the pull bar in pivotally mounting the sickle, the bearing members of the push bar being shown in section.

Fig. 7 is a rear view of the machine with one of the rear wheels broken away to better illustrate the sickle supporting mechanism.

Fig. 8 is a longitudinal section through the sickle shoe particularly illustrating driving of the sickle bar through the axis of the pivotal connection of the sickle bar with the shoe.

Fig. 9 is a detail section through the sickle raising and lowering mechanism on the line 9—9 of Fig. 2.

Fig. 10 is a side elevation of the parts illustrated in Fig. 9.

Fig. 11 is a cross-section on the line 11—11 of Fig. 9.

Fig. 12 is a detail perspective view of the pitman which connects the actuating crank with the sickle bar.

Fig. 13 is a fragmentary perspective view of the lower end of the push bar and trunnion on which the sickle is pivoted to vary angularity thereof relatively to the shoe.

Referring more in detail to the drawings:

1 designates a mowing machine embodying the features of the present invention and which includes a main frame 2 having side rails 3—4 connected by end rails 5—6 and an intermediate cross brace 7. The rear end of the frame is suitably braced by angular bars 8 and 9 extending across the corners of the frame as shown in Fig. 2. The frame 2 is mounted at the respective ends thereof on front and rear axle units 10 and 11 having wheels 12—13 and 14—15. The front wheels 12 and 13 are guidingly mounted on the front axle for steering under control of a steering wheel 16 as in conventional automotive practice, while the rear wheels 14 and 15 are driven through a propeller shaft 17 from a motor 18 that is supported at the forward end of the frame 2 on transverse cross members 19 and 20.

The rear wheels 14 and 15 are provided with suitable brakes that are operated from a countershaft 21 rockably mounted in suitable bearings on the frame 2 and actuated by a hand lever 22 that is located conveniently relative to the driver's seat 23 positioned back of the steering wheel 16. The seat 23 is supported on the frame 2 and includes an arcuate seat portion having a curvature corresponding to the arc of a circle with the steering wheel as a center. This is an important feature in the present invention as it permits the driver to retain an erect position when the machine is used on sloping surfaces, the operator merely sliding to the lowermost side of the seat.

Suspended under the frame 2 at a point intermediate the right-hand side of the frame is a bearing bracket 24 having a bore 25 extending in the longitudinal direction of the frame. Pivotally mounted in the bore is a reduced cylindrical shank 26 of a push bar 27. The shoulder 28 formed by the reduced shank engages the forward end of the bearing bracket to cooperate with a nut 29 that is threaded onto the shank to engage the opposite end of the bearing bracket to prevent longitudinal movement of the push bar but to allow pivotal movement thereof in a vertical direction. The push bar 27 extends downwardly and forwardly in an outward, angular direction from the bearing bracket to terminate in a lateral spindle portion 30 extending laterally of the machine at a point spaced from the right front wheel.

Mounted on the spindle portion 30 of the push bar is a trunnion member 31 having a sleeve portion 32 provided with a bore 33 for accommodating the spindle and which has its inner end threaded to engage threads 34 of the spindle to retain the trunnion member thereon. The trunnion member also includes a cylindrical head 35 having reduced ends 36 and 37 forming trunnions 38 and 39 on which the sickle bar is pivotally mounted.

The inner sickle shoe 40 includes a flat, runner-like plate 41 carrying spaced bearings 42 and 43 at its rear end to mount the trunnions 38 and 39. The forward end of the plate curves upwardly in the direction of the front wheel and is provided with a lug 44 having an opening 45 therein aligning with the axis of the bearings 42 and 43. Engaged within the opening is a lateral end 46 of a pull bar 47, extending inwardly and upwardly to pivotally connect with the cross bar 19 alongside the motor 18, the attaching end of the pull bar being provided with an eye 48 through which a fastening device such as a bolt is extended into an aligning opening in the cross bar. The lateral end 46 of the pull bar has loose engagement in the opening 45 so that the shoe may pivot on the spindle portion of the push bar to raise and lower the forward edge of the sickle bar. The inner shoe 40 may be of various shapes, however, it is preferably provided with a side plate 49 extending from the bearing 23 to a cross rib 50 that is spaced from the lug 44 to protect the sickle reciprocating mechanism now to be described.

The head 35 is provided with an axial bore 51 to rotatably mount a crank operating shaft 52. The shaft 52 projects through the bore and has its ends rotatably mounted in antifriction bearings 53 and 54 inset in the outer ends of the bore as clearly shown in Fig. 8. Fixed to the forward end of the shaft 52 is a disk 55 having an eccentrically mounted crank pin 56 to which is connected the sickle actuating pitman 57 later described. Fixed to the opposite end of the shaft 52 is one of the yoke members 58 of a universal joint 59 that forms a connection with a telescoping shaft 60 having its opposite end connected by a universal joint 61 on a pulley shaft 62. The pulley shaft 62 is mounted in a housing 63 suspended from the side rail 3 and brace 8 of the frame 2 at a point above and slightly forward from the rear axle unit 11 as best shown in Figs. 2 and 4. Rotatably mounted at the opposite side of the housing is a similar pulley shaft 64 having connection with a power take-off 65 that forms a part of the power unit, the pulley shaft being connected with the power take-off by a shaft 66 having universal joints 67 and 68 on the respective ends thereof to connect with the power delivery shaft of the power take-off 65 and with the pulley shaft 64 respectively.

Fixed to the respective pulley shafts are pulleys 69 and 70 having a series of belt grooves 71 for accommodating belts 72 operating over the respective pulleys. The belts are automatically tightened by a roller 73 that operates on the upper runs of the belts and is mounted on the ends of arms 74 and 75 pivotally connected with a rod 76 supported by the housing at a point above the pulley shaft 64. The roller 73 is yieldingly retained against the run of the belt by means of a coil spring sleeved over the rod 76 and having one end bearing against one of the arms and its opposite end bearing against the housing, as best shown in Fig. 4. The belt tightener thus described is operable through a suitable opening 77 provided in the housing. With the construction thus described, the drive from the power take-off is through the rearwardly extending shaft 66 and thence forwardly through the telescoping shaft 60 so that the angular adjustment of the universay joints is kept at a minimum, thereby increasing their efficiency and prolonging the life thereof. The belt drive is also an important feature as it permits slipping of the driving connection in case of stoppage of the sickle bar.

Fixed to the shoe and extending radially therefrom is a sickle 78 including a sickle bar 79 having plates 80 operable over guard teeth 81 as in conventional sickle construction. The outer end of the sickle includes an outer shoe 82 which cooperates with the inner shoe 40 to support the sickle when the shoes are rested on the ground. Fixed on the inner end of the sickle bar is a bracket 83 having a ball shaped head 84 engaged in a ball socket 85 formed on one end of the pitman 57. The pitman 57 is preferably formed of two sections, one consisting of a sleeve 86 that is mounted on the wrist pin 56 by a roller bearing 87 that is retained on the wrist pin by a washer 88 secured to the end of the pin by a cap screw 89, the washer cooperating with the collar on the opposite side of the pin to prevent movement of the bearing relative to the pin.

Projecting from the sleeve is a lug 90 that engages between spaced ears 91 and 92 on the other section 93 and which is connected thereto by a fastening device, such as a bolt passing through apertures 94 in the ears and 95 in the lugs respectively.

In order to lubricate the ball 84 and socket 85, the section 93 of the pitman is provided with an oil reservoir 96 having a flow channel 97 connected therewith and leading to the socket 85. One side 98 of the socket 85 is formed as an integral part of the member 93 but the other side of the socket is a separate part 99 that is secured to the member 93 by means of a spring load bolt 100 extending through suitable openings 101 therein, as shown in Fig. 12, for providing an automatic adjustment.

By constructing the pitman in connected sections, I provide sufficient flexibility to permit free operation of the pitman responsive to gyratory movement of the wrist pin.

In order to change the angular relation of the sickle to its supporting shoe, as for example when cutting an inclined slope while the machine remains on a different angular plane, the bearing 43 of the shoe carries a cable quadrant 103 having a groove 104 to accommodate a cable 105. One end of the cable is anchored, as at 106, to the lower end of the quadrant, while the opposite end runs through a guide 107 on an angle shaped lever 108 that is pivotally connected with the quadrant as at 109. The cable runs over a pulley 110 fixed on the side rail 3 of the frame 2 from where it is carried downwardly under a pulley 111 fixed to the inner side of the rail in alignment with a winding drum 112. The winding drum 112 is best illustrated in Fig. 9 and includes a grooved section 113 shaped to accommodate the lays of the cable. The drum also includes a brake section 114 for mounting a brake band 115 having one end fixed to a bracket 116 and its opposite end fixed to an eccentric pin 117 later described. The drum also includes a ratchet section 118 located on the side thereof opposite the cable section and which has teeth 119.

The drum thus described is rotatable on a shaft 120 having its ends carried on the frame 2 in brackets 121 and 122. The bracket 121 is spaced from the ratchet end of the drum to accommodate a ratchet lever 123 extending upwardly alongside the driver's seat and which is provided with a pivotal pawl 124 that is engageable in the teeth 119 of the ratchet, the pawl being operated by a finger grip lever 126 that is pivoted to the upper end of the lever and which is connected with the pawl by a rod 127. The lever is normally retained against the stop 128 forming a part of the bracket 116. The eccentric pin 117 is mounted on a lever 129 fixed to a rock shaft 130 which is mounted in a bearing bracket 131 carried by the frame 2 as shown in Fig. 2. Fixed on the opposite end of the rock shaft is a foot pedal 132 located in convenient position to be reached by the foot of the operator so that when the foot lever is depressed the eccentric contracts the brake band about the brake section of the drum to prevent rotation thereof.

In order to raise and lower the elevation of the sickle without changing the angular position thereof relative to the shoe, the push bar is provided with a loop 133 for connecting a chain 133' having its opposite end connected with a lever arm 134 fixed to the hub 135 of a hand lever 136 extending upwardly alongside and slightly forwardly of the hand lever 123, previously described. The hand lever 136 is mounted in a bearing bracket 137 and has a pivoted pawl 138 engageable in the teeth 139 of a fixed rack segment 140. The pawl is operated by a rod 141 that is connected with a finger grip lever 142 pivoted on the upper end of the hand lever. By rocking the lever and releasing the hand grip the pawl engages the teeth of the fixed rack to support the lever in adjusted position for suspending the sickle shoe at the desired elevation relative to the ground.

In order to pivot the sickle on the spindle portion of the push bar, the push bar is provided with a bracket 143 having an opening 144 therein for accommodating a cam 145 that is eccentrically mounted on a lug 146 of the trunnion member 31. The eccentric cam is mounted on a pin 147 having a lever 148 at its outer end connected by a link 149 with a hand lever 150 located adjacent the driver's seat and which is pivotally mounted on the brake rod 21. The lever is retained in adjusted position by a rack segment 151 having teeth 152 adapted to be engaged by a pawl 153 on the hand lever and which is operated by a finger grip 154 through a connecting rod 155.

In operating a machine constructed and assembled as described, and assuming that the motor is in operation to propel the machine, the hand lever 136 is released from the gear segment by releasing the pawl 138, whereupon the lever is moved in a forward direction, thereby lowering the inner shoe until it is at the desired elevation. Upon releasing the finger grip the pawl again engages the rack to support the shoe in adjusted position. The finger grip of the hand lever 123 is then actuated to release the pawl from engagement with the ratchet teeth. The drum is then free to rotate under the gravitational influence of the sickle bar. The cable quadrant 103, being attached to the shoe, moves downwardly with the sickle bar, paying the cable over the pulleys and through the guide.

When the sickle bar is at the desired cutting angle, the foot brake is applied by pressing the foot against the pedal 132 to thereby cause contraction of the brake band about the drum and stop rotation thereof. The pawl 124 on the ratchet lever 123 is then allowed to reengage the teeth 119 of the ratchet 118 to support the sickle at the selected angle. Should it be necesary to change the angle of the sickle bar, for example to increase the angle, the ratchet lever is rocked in rearward direction to wind the cable on the drum. After the lever is moved to its maximum extent and it is still necesary to increase the angle of inclination, the foot brake is applied to hold the drum while the lever is swung forwardly to effect another engagement of the pawl with the ratchet, whereupon the lever is again swung in a rearward direction causing further inclination of the sickle. When the sickle is in adjusted position the brake is again applied and the ratchet lever is drawn forwardly until it engages the stop 128 whereupon the pawl reengages the ratchet to cooperate with the stop for preventing rotation of the drum.

The elevation of the sickle bar may be changed while held at the selected angle of inclination by merely operating the hand lever 136. Since the sickle drive is through the pivotal axis of the sickle, it does not change the relationship of the sickle blades with the guard teeth.

Upon engagement of the power take-off, the shaft 66 is operated to drive the pulley 70, which in turn drives the pulley 69 through the belts 72 to drive the telescoping shaft which causes rotation of the crank shaft 52. Rotation of the crank shaft causes gyration of the wrist pin to reciprocate the pitman which in turn reciprocates the sickle bar. During reciprocation of the pitman, the oil contained in the reservoir 96 is caused to flow through the passage 97 into the ball socket, thereby furnishing an adequate supply of lubricant to the ball and socket joint.

With the sickle drive as above described, the sickle is operated independently of the drive of the mower so that the mower may be driven at the desired speeds either in a forward direction or in reverse, without interfering with the desired operational speed of the sickle, or the sickle may remain idle while the mower is being driven or vice versa.

From the foregoing, it is obvious that I have provided a mowing machine which is well adapted for mowing the vegetation along the sides of a highway, and which is so constructed that it is readily adjusted to closely follow irregular surfaces, such as the shoulders, back slopes, drainage ditches, cuts and fills that are encountered along an ordinary highway. The machine constructed as described is of substantially light weight and is short-coupled so that it may be operated in and out of the ditches to gain access to all the vegetation growing along the highway.

What I claim and desire to secure by Letters Patent is:

1. In an apparatus of the character described including a mobile frame, a trunnion member, means mounted substantially in the horizontal plane of said frame for supporting the trunnion member for swinging movement in a vertical plane relatively to said frame, an inner sickle shoe mounted on the trunnion member, a drive shaft rotatably mounted in the trunnion member in the axis thereof, a crank on the drive shaft, a sickle carried by said shoe including a sickle bar, a pitman connecting the crank with the sickle bar, a quadrant fixed to the shoe, a cable engaged with the quadrant, means on the frame substantially in the horizontal plane thereof and connected with the cable to pivot the sickle on said trunnion member, and means mounted substantially in the horizontal plane of the frame for raising and lowering the trunnion member independently of said sickle pivoting means.

2. In an apparatus of the character described including a mobile frame, a trunnion member, means mounted substantially in the horizontal plane of said frame for supporting the trunnion member for swinging movement in a vertical plane relative to said frame, an inner sickle shoe mounted on the trunnion member, a drive shaft rotatably mounted in the trunnion member in the axis thereof, a crank on the drive shaft, a sickle carried by said shoe including a sickle bar, a pitman connecting the crank with the sickle bar, a quadrant fixed to the shoe, a cable engaged with the quadrant, means on the frame substantially in the horizontal plane thereof and connected with the cable to pivot the sickle on said trunnion member, means mounted substantially in the horizontal plane of the frame for raising and lowering the trunnion member independently of said sickle pivoting means, and means on the frame for pivoting the sickle to vary its angularity lengthwise relative to the ground.

3. In an apparatus of the character described including a mobile frame, a trunnion member, means mounted substantially in the horizontal plane of said frame for supporting the trunnion member for swinging movement in a vertical plane relative to said frame, an inner sickle shoe mounted on the trunnion member, a drive shaft rotatably mounted in the trunnion member in the axis thereof, a crank on the drive shaft, a sickle carried by said shoe including a sickle bar, a pitman connecting the crank with the sickle bar, means on the frame to pivot the sickle on said trunnion member, and means mounted substantially in the horizontal plane of the frame for raising and lowering the trunnion member independently of said sickle pivoting means.

4. In an apparatus of the character described including a mobile frame, a trunnion member, means mounted substantially in the horizontal plane of said frame for supporting the trunnion member for swinging movement in a vertical plane relative to said frame, an inner sickle shoe mounted on the trunnion member, a drive shaft rotatably mounted in the trunnion member in the axis thereof, a crank on the drive shaft, a sickle carried by said shoe including a sickle bar, a pitman connecting the crank with the sickle bar, a quadrant fixed to the shoe, a cable engaged with the quadrant, and means on the frame substantially in the horizontal plane thereof and connected with the cable to pivot the sickle on said trunnion member.

5. In an apparatus of the character described including a mobile frame, a trunnion member, means mounted substantially in the horizontal plane of said frame for supporting the trunnion member for swinging movement in a vertical plane relative to said frame, an inner sickle shoe mounted on the trunnion member, a drive shaft rotatably mounted in the trunnion member in the axis thereof, a crank on the drive shaft, a sickle carried by said shoe including a sickle bar, and a pitman connecting the crank with the sickle bar.

6. In an apparatus of the character described including a mobile frame, a trunnion member on said frame, an inner sickle shoe mounted on the trunnion member, a drive shaft rotatably mounted in the trunnion member in the axis thereof, means for actuating said drive shaft, a crank on the drive shaft, a sickle carried by said shoe including a sickle bar, and a pitman connecting the crank with the sickle bar.

7. In an apparatus of the character described including a mobile frame, a supporting member mounted on said frame, a sickle shoe pivotally mounted on the supporting member, a sickle carried by said shoe including a sickle bar, means for actuating said sickle bar, a quadrant fixed to the shoe, a cable engaged with the quadrant, and means on the frame substantially in the horizontal plane thereof and connected with the cable to pivot the sickle on said supporting member.

CHARLES L. MEINHOLDT.